(12) United States Patent
Reddy et al.

(10) Patent No.: US 9,314,732 B2
(45) Date of Patent: Apr. 19, 2016

(54) SYSTEMS AND METHODS FOR REDUCING THE ENERGY REQUIREMENTS OF A CARBON DIOXIDE CAPTURE PLANT

(71) Applicant: FLUOR TECHNOLOGIES CORPORATION, Aliso Viejo, CA (US)

(72) Inventors: Satish Reddy, Laguna Beach, CA (US); Joe Yonkoski, Irvine, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 420 days.

(21) Appl. No.: 13/737,804

(22) Filed: Jan. 9, 2013

(65) Prior Publication Data
US 2014/0190351 A1   Jul. 10, 2014

(51) Int. Cl.
*B01D 53/14* (2006.01)
*B01D 53/34* (2006.01)

(52) U.S. Cl.
CPC .......... *B01D 53/1425* (2013.01); *B01D 53/343* (2013.01); *B01D 53/1475* (2013.01); *B01D 2257/504* (2013.01); *B01D 2259/65* (2013.01); *Y02C 10/06* (2013.01)

(58) Field of Classification Search
CPC ............. B01D 53/1425; B01D 53/343; B01D 2257/504; B01D 2259/65; B01D 53/1475; Y02C 10/06
See application file for complete search history.

(56) References Cited

U.S. PATENT DOCUMENTS

| | | | | |
|---|---|---|---|---|
| 2,157,879 A | * | 5/1939 | Zublin | 423/223 |
| 3,352,631 A | * | 11/1967 | Zarker | 423/229 |
| 3,823,222 A | * | 7/1974 | Benson | 423/223 |
| 4,134,795 A | * | 1/1979 | Howat, III | 203/53 |
| 4,246,073 A | * | 1/1981 | Umeda et al. | 203/25 |
| 4,444,571 A | | 4/1984 | Matson | |
| 4,798,910 A | * | 1/1989 | Herrin | 564/497 |
| 5,035,776 A | * | 7/1991 | Knapp | 203/19 |
| 5,215,902 A | * | 6/1993 | Tedder | 435/161 |
| 5,344,627 A | | 9/1994 | Fujii et al. | |
| 5,956,973 A | * | 9/1999 | Herron et al. | 62/646 |
| 7,007,474 B1 | | 3/2006 | Ochs et al. | |
| 2006/0204425 A1 | * | 9/2006 | Kamijo | B01D 53/1425 423/437.1 |
| 2007/0221065 A1 | | 9/2007 | Aroonwilas et al. | |
| 2010/0050637 A1 | | 3/2010 | Yamashita et al. | |
| 2011/0011088 A1 | | 1/2011 | Iijima et al. | |
| 2013/0255502 A1 | * | 10/2013 | Tsujiuchi et al. | 96/242 |

FOREIGN PATENT DOCUMENTS

| | | |
|---|---|---|
| WO | 2011/019335 | 2/2011 |
| WO | 2011/073671 | 6/2011 |
| WO | 2012/038865 | 3/2012 |

OTHER PUBLICATIONS

Patent Cooperation Treaty, "Notification of Transmittal of the International Search Report and the Written Opinion of the International Searching Authority, or the Declaration", PCT Application No. PCT/US13/20890, issued Oct. 18, 2013.

* cited by examiner

*Primary Examiner* — Amber R Orlando
*Assistant Examiner* — Britanny Precht
(74) *Attorney, Agent, or Firm* — Conley Rose, P.C.; Kristin Jordan Harkins

(57) ABSTRACT

Systems and methods for reducing the energy requirements for carbon dioxide capture are described. Heat from system processes, such as steam condensation and hot flue gas, is utilized to heat reflux liquid utilized in release of carbon dioxide from absorbent solvent.

4 Claims, 4 Drawing Sheets

SYSTEMS AND METHODS FOR REDUCING THE ENERGY REQUIREMENTS OF A CARBON DIOXIDE CAPTURE PLANT

FIELD OF THE INVENTION

The field of the invention is systems and methods for capturing carbon dioxide.

BACKGROUND

Despite the growing availability of alternative energy sources, the energy needs of most of the world are primarily met by the combustion of fossil fuels such as coal, oil, and natural gas. Among other byproducts, such combustion produces carbon dioxide ($CO_2$), the release of which into the environment is becoming increasingly regulated. $CO_2$ emissions may be mitigated, at least in part, by capturing $CO_2$ directly from large sources of emissions, such as generating plants that combust fossil fuels as a power source. Rather than simply venting $CO_2$ into the atmosphere, $CO_2$ can be removed from flue gases using a $CO_2$ absorber. The captured $CO_2$ may then be utilized in other processes or sequestered. Similar capture methods can also be applied to other industrial processes that generate significant amounts of $CO_2$ including, for example, ammonia production, fermentation processes, removal of $CO_2$ from natural gas or biofuel products, and so forth.

$CO_2$ is generally separated from a gas mixture by absorption. The flue gas, for example, may be a flue gas generated by a boiler that produces steam for a power plant. In a typical process the gas mixture is passed through an absorption column where the gas is exposed to a capture medium that absorbs some or all of the $CO_2$ component of the mixture. Typically, this absorbent is in a liquid phase and is often an aqueous solvent that contains one or more amine compounds. Such a process is sometimes referred to as wet scrubbing. The gas mixture is passed through the absorption solution at pressure and temperature conditions that permit absorption of substantially all the $CO_2$ into the absorption solvent. The $CO_2$-lean gas mixture emerges at the top of the absorption column and may be directed for further processing as necessary. The absorption solvent, which is now rich in $CO_2$ (i.e. a rich solvent), exits from the bottom of the absorption column, and is then subjected to a stripping process to remove the $CO_2$ and regenerate an absorption solvent that is lean in $CO_2$ (i.e. a lean solvent).

Regeneration of the lean solvent typically involves heating the rich solvent to reduce the solubility of $CO_2$. To ensure complete or near complete removal of $CO_2$, the rich solvent may undergo successive cycles of reheating. In a typical solvent regeneration process, rich solvent is introduced into a regeneration column at a high temperature. This elevated temperature is maintained by a reboiler. At these elevated temperatures, the rich solvent releases absorbed $CO_2$. The regenerated lean solvent may be collected from the bottom of the regeneration column for reuse in the absorption column, while a gas phase containing the stripped $CO_2$ (along with water) is collected from the top of the regeneration column. This gas phase may be passed through a condenser system that condenses water vapor and returns the liquid to the regeneration column. The released $CO_2$ may then be collected for reutilization or sequestration.

As noted above, the energy requirements for existing absorption and recovery processes can be significant, in large part due to the heat required for stripping $CO_2$ from the rich solvent. Because this heat is typically derived from steam that would otherwise be used for power production, the heat requirements of the reboiler can reduce net power production. Attempts have been made to reduce this burden by redirecting heat from other plant processes. For example, U.S. Pat. No. 5,344,627 (to Fujii et al) discusses discharging steam from a high pressure turbine and directing it to an auxiliary turbine that powers a compressor used to liquefy recovered $CO_2$. The steam discharge of this auxiliary turbine provides heat for a reboiler. In WIPO publ. no. WO2011/073671, Hume and Kuczynska describe a similar approach in which steam discharged from a high pressure turbine is utilized to drive a back pressure turbine, which in turn drives a compressor used to compress $CO_2$ recovered from the rich solvent. This compression produces heat, which along with heat from the exhaust of the back pressure turbine, is supplied to the reboiler. However, since the discharge from high pressure turbines is typically utilized in lower pressure turbines to generate additional power, these approaches still directly impact power generation.

A similar approach is described in U.S. pat. publ. no. 2010/0050637 (to Yamashita et al), which discloses diverting a portion of the steam input to a low pressure turbine to drive an auxiliary turbine, and utilizing the steam exhaust from this auxiliary turbine as a heat source for a reboiler. Since this directly impacts the power output of the low pressure turbine, however, power generation is still impacted. An alternative approach is disclosed in U.S. pat. publ. no. 2010/0050637 (to Yamashita et al), where a reboiler is supplied with heat via a heating medium, which is in turn receives heat from the flue that transports the initial waste gases via a heat exchanger. It is, however, unclear if such a source can provide sufficient heat at the proper temperature for the needs of the reboiler.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for systems and methods that reduce the energy requirements for regeneration of solvents used in $CO_2$ capture from flue gases, particularly in power generation plants that rely on fossil fuel combustion.

SUMMARY OF THE INVENTION

The inventive subject matter provides apparatus, systems and methods in which one can remove $CO_2$ from flue gases using a solvent system and regenerate solvent in an energy efficient manner. In an embodiment of the inventive concept, a boiler heated by fossil fuel combustion generates steam that may be used for power generation, and in this process generates hot flue gas containing $CO_2$. $CO_2$ can be captured from this flue gas in a $CO_2$ capture unit that utilizes a solvent, which absorbs $CO_2$ and thereby generates a rich solvent. This rich solvent is directed to a stripper, where it typically moves against stripping steam in a counterflow fashion. Such flow releases at least a portion of the $CO_2$ from the rich solvent to generate a semi-lean solvent, which exits from a lower portion of the stripper. All or a portion of the semi-lean solvent can be directed to a reboiler, where it is heated with low pressure steam. At least a portion of this steam condenses in this process to release heat to the semi-lean solvent via a phase change. A portion of the semi-lean solvent vaporizes to form a 2-phase mixture. This 2-phase mixture is returned to the stripper, where the vapor phase joins the stripping steam that flows up through the stripper. The liquid phase exits from a bottom portion of the stripper as a lean solvent; this lean solvent is in turn directed to a $CO_2$ capture unit.

Stripping steam carrying released $CO_2$ exits from a top portion of the stripper as a $CO_2$ saturated stream. The $CO_2$ saturated stream is carried to a condenser where a majority of the water can be condensed to a liquid to generate a process condensate. $CO_2$ is subsequently separated from the process condensate in an overhead accumulator. From the overhead accumulator, the process condensate may be directed to various paths. For example, a portion of the process condensate may be returned to the upper portion of the stripper as reflux. Another portion of the process condensate may be directed to a reflux heater, where heat from the hot flue gas may be used to generate steam that is routed to the stripper for use as stripping steam. Yet another portion of the process condensate may be directed for use in various plant processes. In some embodiments of the inventive concept the condensate from the low pressure steam utilized to heat the reboiler can be used as a heat source in the reflux heater, which produces a sub-cooled steam condensate, thereby lowering the net steam requirement of the $CO_2$ capture plant.

One embodiment of the inventive concept is a system for reducing the energy requirements of a $CO_2$ capture process in a plant, where the system includes a stripper that receives a rich solvent stream, steam, and a reflux stream, and produces a lean solvent and an upper product that includes $CO_2$. Such a system may include a condenser that receives the upper product and produces a condensed stream, and a heat exchanger that receives at least a portion of the condensed stream. The heat exchanger can be arranged to transfer heat between a heat exchange medium and a portion of the condensed stream to produce steam. In some embodiments of the inventive concept, the heat exchanger may receive a portion of the condensed stream, and the reflux stream includes another portion of the condensed stream. In other embodiments of the inventive concept, the system also includes an accumulator that receives a portion of the condensed stream, and produces a $CO_2$ product stream and a condensate stream. This condensate stream may form at least a part of the condensed stream that is received by the heat exchanger. The heat exchange medium can be a flue gas stream and/or a reboiler condensate. In such an embodiment, the stripper may have a fluid connection to a reboiler, which may allow for an exchange of heat between a solvent stream of the stripper and a second heat exchange medium. This heat exchange may produce a reboiler stream and a reboiler condensate.

Another embodiment of the inventive concept is a system for reducing the energy requirements of a $CO_2$ capture process, which includes a stripper that receives a rich solvent and a reflux stream and produces an upper product that includes $CO_2$. Such a system may include a condenser that produces a condensed stream from at least a portion of this upper product, and may also include an accumulator that receives the condensed stream and produces a condensate stream. At least part of this condensate stream may be returned to the stripper as a reflux stream. Part of the condensate stream may also be directed to a heat exchanger, where heat transfer between the condensate stream and a heat exchange medium produces steam. A portion of this steam may be directed to the stripper. In such an embodiment, the heat exchange medium can be a flue gas stream and/or a reboiler condensate. In some embodiments of the inventive concept, the stripper may be in fluid communication with a reboiler, which may permit heat exchange between a solvent stream from the stripper and a second heat exchange medium, thereby producing reboiler steam and/or reboiler condensate.

Yet another embodiment of the inventive concept is a method for reducing energy requirements in a $CO_2$ capture process. Preferred methods include the steps of producing a condensed stream from at least part of an upper product stream of a stripper (which may include $CO_2$) by condensation and directing at least part of this condensed stream to the stripper as a reflux stream. Such methods may also include exchanging heat between a portion of the condensed stream and a heat transfer medium in a heat exchanger to produce steam; this steam may in turn be directed to the stripper. This heat transfer medium can be, for example, a flue gas from an upstream component such as a boiler. Alternatively, the heat transfer medium can be a reboiler condensate. In other embodiments, at least a portion of the solvent stream may be directed from the stripper and utilized to cool a second heat transfer medium using a heat exchanger. In such an embodiment the second heat transfer medium can be a reboiler condensate. At least a portion of the condensed stream may be separated into a $CO_2$ product stream and a condensate stream. In some embodiments the condensed stream may include, at least in part, a portion of the condensate stream.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
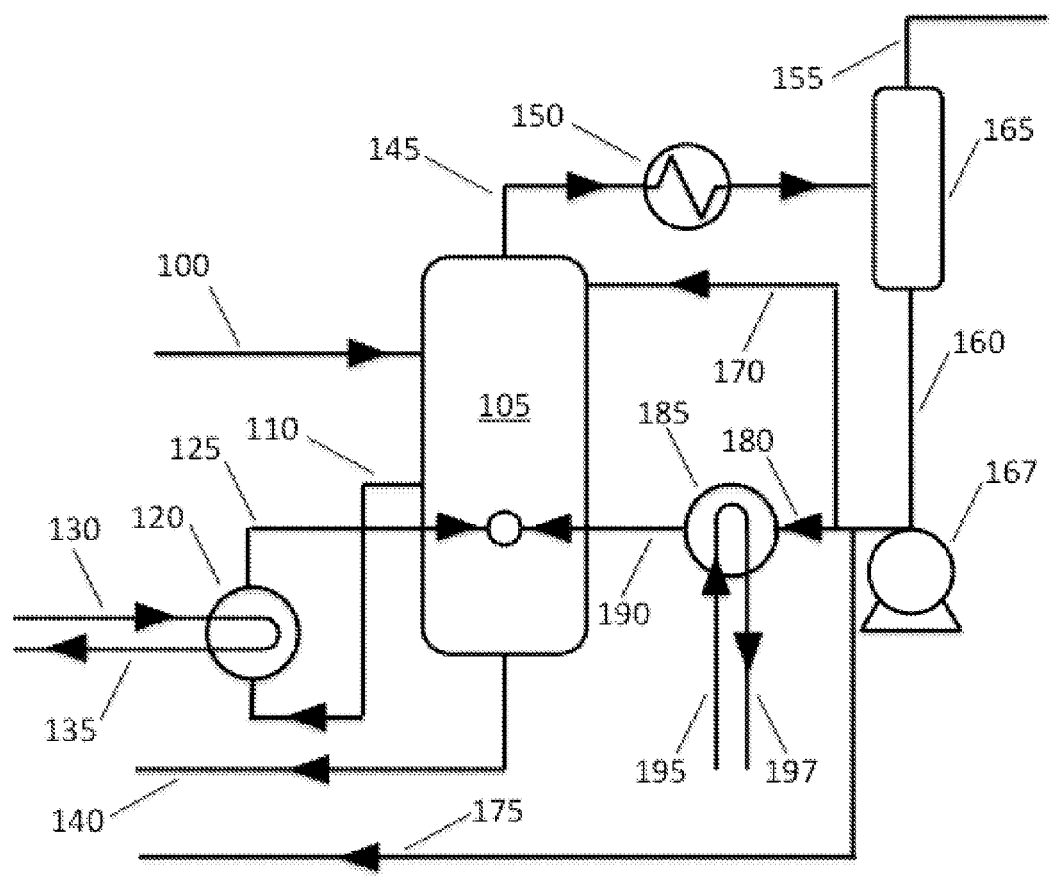
FIG. 1 is a schematic of one embodiment of the inventive concept, in which heat from flue gas is utilized to heat reflux that is returned to a stripper.

It should be noted that while the following description is drawn to systems and methods for improving the energy efficiency of recovering $CO_2$ from flue gases, various alternative configurations are also deemed suitable and may be employed to treat any suitable source of $CO_2$ containing gas streams, such as streams from combustion processes in the oil and gas industry, cement plants, lime kiln exhausts, engine exhausts, fermentation processes, hydrogen production plants, ammonia production plants, processing of phosphates, and so forth. One should appreciate that compounds other than $CO_2$ may be recovered, including (but not limited to) CO, ammonia, nitrogen oxides, sulfur oxides, volatile organic carbon compounds, and chlorofluorocarbons, from gas streams containing such compounds.

One should also appreciate that the disclosed techniques provide many advantageous technical effects including reduction in the application of high temperature heat to solvents utilized in $CO_2$ recovery (thereby minimizing their degradation), reduction of water consumption in the $CO_2$ recovery process by generating stripping steam utilized for solvent recovery from process water, and reduction of the temperature of flue gases prior to $CO_2$ capture, thereby reducing the need for active cooling of flue gas prior to entering a $CO_2$ capture unit.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems and methods in which one can remove $CO_2$ from flue gases using a solvent system and regenerate the $CO_2$ capture solvent in an energy efficient manner. In one embodiment of the inventive concept, a boiler heated by fossil fuel combustion generates steam that may be used for power generation, for example by providing high pressure steam that is directed through a series of turbines used to generate electric power. It is contemplated, however, that systems and methods of the inventive concept may also be applied to combustion processes utilized in the coal, gas, and/or petroleum industries (such as, for example, from a reformer furnace, a gas turbine, a water heater, a steam generator, a reboiler, and a liquefied natural gas heater).

Such processes generate hot flue gas that contains $CO_2$, release of which into the atmosphere is being increasingly regulated. Therefore, there is considerable interest in the removal of $CO_2$ from such flue gas prior to being exhausted to the atmosphere; the $CO_2$ may then be utilized in other processes or sequestered to prevent environmental release. $CO_2$ may be captured from flue gas in a $CO_2$ capture unit. Typically, such devices provide contact between the flue gas and an absorptive media that solvates or otherwise captures $CO_2$. Typical liquid absorptive solvents include amines or similar compounds, often admixed with water. However, any commercially suitable solvent could be used. Uptake of $CO_2$ by such a solvent generates a rich solvent (i.e. a solvent rich in $CO_2$). For peak efficiency, such processes should be optimized for temperature and pressure that provides optimal $CO_2$ uptake by the solvent, which often requires cooling the hot flue gas from combustion processes (for example using refrigerated contact coolers) to bring the flue gas to optimal temperature.

Following absorption of $CO_2$ from flue gases, $CO_2$ is removed from the rich solvent using a stripper. Temperature and pressure conditions within the stripper decrease the solubility of $CO_2$ in the solvent; typically, the temperature of the absorptive solvent is increased in order to release the absorbed gas. In addition, strippers generally include internal packing or similar structure to increase surface area and expose more solvent to the internal atmosphere. Heat may be provided in the form of steam, which may be introduced through a lower portion of the stripper so that steam and solvent interact in a counterflow fashion. The resulting lean solvent may be collected from the lower part of the stripper (from where it may be returned for use in a $CO_2$ capture unit) while the released $CO_2$ can be collected from the upper portion. In practical terms it is often necessary to pass the solvent through the stripper repeatedly in order to remove all (or essentially all) of the absorbed $CO_2$, so solvent is typically refluxed through the stripper.

The process of removing $CO_2$ from the rich solvent therefore requires considerable heat energy, which is supplied to the solvent, at least in part, by a reboiler that is in fluid communication with the stripper. As noted above, it is a common practice to utilize a portion of the steam that is produced by a fossil fuel driven boiler to provide this heat, however this practice directly impacts the efficiency of the plant. Systems and methods of the inventive concept utilize heat energy produced by system processes to alternatively provide heat for the reboiler and thereby improve plant efficiency.

One embodiment of the inventive concept is shown in FIG. 1. Rich solvent (100) from a $CO_2$ capture unit (not shown) is directed to a stripper (105). A semi-lean solvent (110) is collected from a point below the packing and directed to a reboiler (120), where it is heated. Heat energy is preferably supplied to the reboiler (120) in the form of low pressure steam (130), although any commercially suitable heat exchange media could be used. Such steam may, for example, be collected from the exhaust of a turbine. Examples of suitable turbines include, for example, a low pressure turbine from a series of high, mid, and low pressure turbines utilized for power generation and a turbine used to power a compressor. Utilization of such sources of low pressure steam also advantageously minimizes the impact on power generation. In addition, the use of steam raised from process water advantageously maintains the water balance of the plant by eliminating the need to inject water from an outside source into the system.

At least a portion of the low pressure steam condenses in this process, generating a reboiler condensate (135), and transferring the resulting heat of condensation from the condensing steam to the solvent. Utilization of this phase change for energy transfer advantageously reduces exposure of the solvent to high temperatures, such as those that are experienced when solvent is heated using high pressure steam, which minimizes degradation of the solvent. This results in vaporization of a portion of the semi-lean solvent, and the resulting two phase solvent (125) is returned to the stripper (105). This releases stripping steam within the stripper (105), where the substantially $CO_2$ free lean solvent (140) is removed from a lower portion of the stripper (105) and may be directed to a $CO_2$ capture unit. In some embodiments of the inventive concept the lean solvent (140) is removed from the bottom of the stripper (105). Stripping steam rises through the stripper (105), carrying released $CO_2$ through the upper part of the stripper (105) as a $CO_2$ saturated stream (145). It is contemplated that $CO_2$ may be released from other components of the $CO_2$ saturated stream (145) by cooling in a condenser (150), and subsequently separated from liquid components in an accumulator (165). In typical overhead accumulator (165) configurations, product $CO_2$ (155) is collected from an upper portion and product condensate (160) is collected from a lower portion. This condensate (160) may be primarily water, but may include amines or other compounds utilized in the capture of $CO_2$.

Condensate (160) may be distributed to one or more destination processes, optionally with the aid of a pump (167). Embodiments of the inventive concept may include one or more valves and/or pump(s) and an associated controller that permits control of the distribution of the condensate (160) in order to optimize plant operations. It is contemplated that condensate (160) may be directed to two or more destination processes and/or locations simultaneously. In some embodiments of the inventive concept, at least a portion of the condensate (160) can be directed to the stripper (105) as reflux (170). In other embodiments of the inventive concept, at least a portion of the condensate (175) can be directed to other parts of the plant. In still other embodiments of the inventive process, at least a portion of the condensate (180) can be directed to a reflux heater (185).

A reflux heater (185) may be used to heat the condensate (160) to generate steam (190) utilizing heat from a suitable source. Suitable sources include, for example, hot flue gas (195) and a reboiler condensate and may be transferred to the condensate (160) via a heat exchanger. Where the source is a flue gas, the flue gas may, for example, originate in a boiler utilized to generate steam for power generation, but may alternatively be obtained from other combustion sources such as a burner, a reformer furnace, a gas turbine, a water heater, a steam generator, a reboiler, and/or a liquefied natural gas heater. It is contemplated that one or more flue gas sources may be combined to provide a pooled flue gas source for the reflux heater (185). This process reduces the temperature of the flue gas to produce a cooled flue gas (197), which may be routed to other parts of the $CO_2$ capture process; this cooling of the flue gas advantageously reduces the size and/or duty cycle of cooling units utilized in the processing of hot flue gas prior to introduction to a $CO_2$ capture unit. Steam (190) produced in the reflux heater (185) may directed to the stripper (105), where it may be used to aid in the $CO_2$ removal process.

Figure 2:
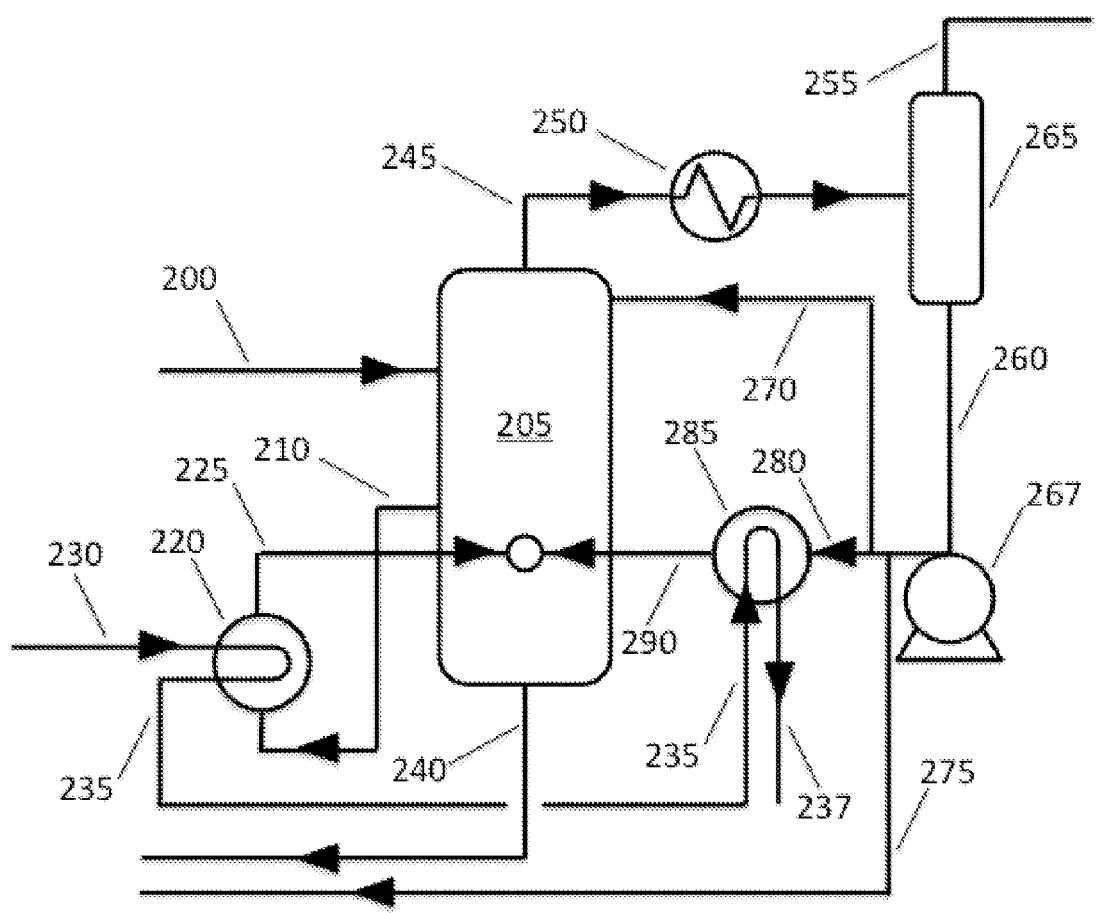
FIG. 2 is a schematic of another embodiment of the inventive concept, in which heat from condensed low pressure steam is utilized to heat reflux that is returned to a stripper.

Another embodiment of a system of the inventive concept is shown in FIG. 2. Rich solvent (200) from a $CO_2$ capture unit (not shown) is directed to a stripper (205). A semi-lean solvent (210) is collected from a point below the packing and directed to a reboiler (220), where it is heated. Heat energy may be supplied to the reboiler (220) in the form of low pressure steam (230). Such steam may, for example, be collected from the exhaust of a turbine. Examples of suitable turbines include, but are not limited to, a low pressure turbine from a series of high, mid, and low pressure turbines utilized for power generation and a turbine used to power a compressor. Utilization of such sources of low pressure steam advantageously minimizes the impact on power generation.

At least a portion of the low pressure steam condenses in this process, generating a reboiler condensate (235), and transferring the resulting heat of condensation from the condensing steam to the solvent. Utilization of this phase change for energy transfer advantageously reduces exposure of the solvent to high temperatures, such as those that are experienced when solvent is heated using high pressure steam, which minimizes degradation of the solvent. This results in vaporization of a portion of the semi-lean solvent, and the resulting two phase solvent (225) is returned to the stripper (205). This releases stripping steam within the stripper (205), where the substantially $CO_2$ free lean solvent (240) is removed from a lower portion of the stripper (205) and may be directed to a $CO_2$ capture unit.

In some embodiments of the inventive concept, the lean solvent (240) is removed from the bottom of the stripper (205). Stripping steam rises through the stripper (205), carrying released $CO_2$ through the upper part of the stripper (205) as a $CO_2$ saturated stream (245). $CO_2$ may be released from other components of the $CO_2$ saturated stream (245) by cooling in a condenser (250), and subsequently separated from liquid components in an accumulator (265). In typical overhead accumulator (265) configurations, product $CO_2$ (255) is collected from an upper portion and product condensate (260), condensate is collected from a lower portion. This condensate (260) may be primarily water, but may include amines or other compounds utilized in the capture of $CO_2$.

Condensate (260) may be distributed to one or more destination processes, optionally with the aid of a pump (267). Embodiments of the inventive concept may include one or more valves and/or pump(s) and an associated controller that permits control of the distribution or the condensate (260) in order to optimize plant operations. In some embodiments of the inventive concept, at least a portion of the condensate (260) can be directed to the stripper (205) as reflux (270). In other embodiments of the inventive concept, at least a portion of the condensate (275) can be directed to other parts of the $CO_2$ capture process (not shown). In still other embodiments of the inventive process, at least a portion of the condensate (280) can be directed to reflux heater (285). The reflux heater (285) may use the condensate (260) to generate steam (290) utilizing heat from a suitable source. In such an embodiment heat may be supplied to the reflux heater (285) by condensate (235) produced by prior heat transfer in a reboiler (220). Heat transfer from the condensate (235) generates a sub-cooled condensate (237). Steam (290) produced in the reflux heater (285) may be directed to the stripper (205), where it may be used to aid in the $CO_2$ removal process.

Figure 3:
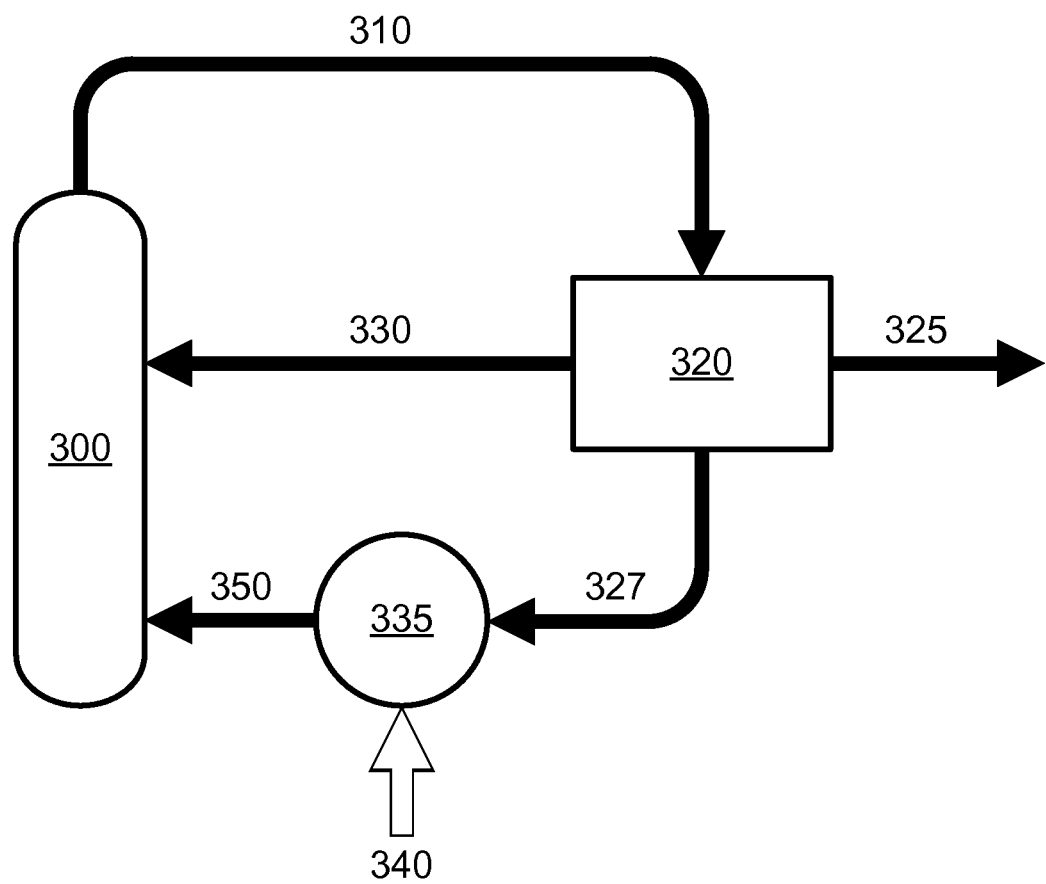
FIG. 3 illustrates a method of the inventive concept, in which a product from a stripper is treated for return to the stripper.

An embodiment of a method of the inventive concept is shown in FIG. 3. At least a portion of an upper product (310) obtained from a stripper (300) may be condensed in condenser (320) to produce a condensed stream. Part of this condensed stream from condenser (320) may be returned to the stripper (300) as a reflux stream (330). Another part of this condensed stream may be provided to a heat exchanger (335) that transfers heat from a heat transfer medium (340) to produce steam (350) that is returned to the stripper (300). The heat transfer medium may be flue gas, produced by an upstream boiler or other device and/or devices as described above. Alternatively, the heat transfer medium may be a condensate from a reboiler. In some embodiments of the inventive concept the condensed stream may be separated into a $CO_2$ product (325) and a condensate stream (327), where the condensate stream forms at least part of the material that is provided to the heat exchanger (335) for production of steam (350).

Figure 4:
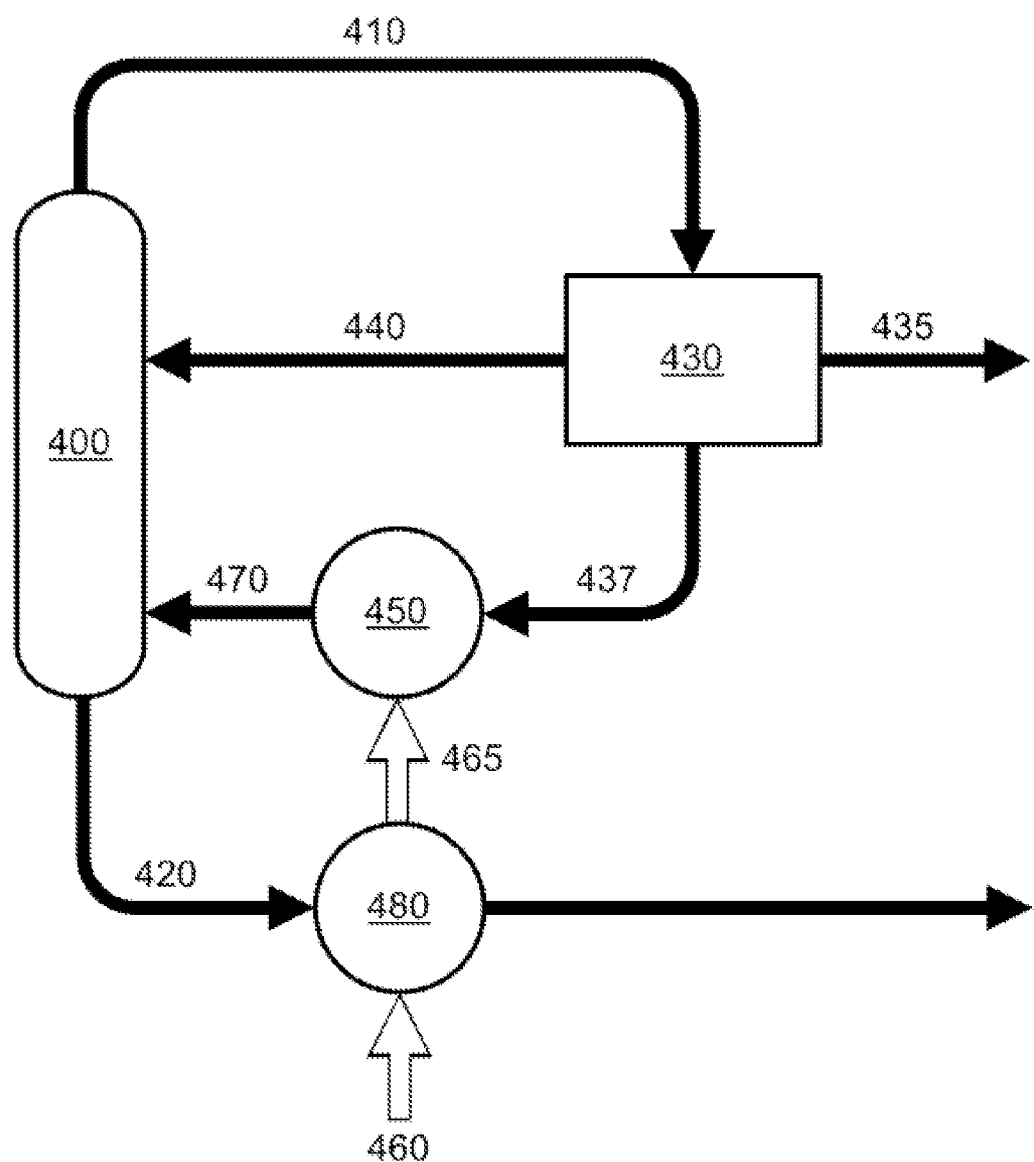
FIG. 4 illustrates a method of the inventive concept in which a product from a stripper is treated with heat from a second product of the stripper for return to the stripper.

Another embodiment of a method of the inventive concept is illustrated in FIG. 4. An upper product stream (410) and a solvent stream (420) are obtained from a stripper (400). At least a portion of the upper product stream (410) may be condensed in condenser (430) to produce a condensed stream. A portion of this condensed stream from condenser (430) may be returned to the stripper (400) as a reflux stream (440). A second portion of this condensed stream may be provided to a heat exchanger (450) to produce steam (470) that is returned to the stripper (400). The solvent stream (420) may be heated in a second heat exchanger (480) using a second heat transfer medium (460); the resulting cooled second heat transfer medium (465) may in turn be utilized by the heat exchanger (450) to produce at least a portion of the steam (470) utilized by the stripper (400). The heat transfer medium (460) may be may be, for example, a low pressure steam. In some embodiments of the inventive concept the condensed stream may be separated into a $CO_2$ product (435) and a condensate stream (437), where the condensate stream forms at least part of the material that is provided to the heat exchanger (450) for production of steam (470).

In embodiments of the inventive concept where reboiler condensate (235) is used as a heating medium in a reflux heater (285), the condensate can return to the power plant colder in the current art, however, net steam demand is reduced. Typical reductions in steam demand for the present invention may be around 6%. In the case of a power plant, embodiments of the inventive concept reduce the need for low pressure steam to heat the solvent, which can advantageously increase the power output of the generator. This advantageously mitigates the impact of any retrofitting that would be required for a low pressure steam turbine during the installation of a carbon capture plant utilizing an embodiment of the inventive concept.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for reducing energy requirements of a carbon dioxide ($CO_2$) capture process in a plant, comprising:
   a stripper configured to (a) receive a rich solvent, steam, and a reflux stream, and (b) produce a lean solvent and an upper product comprising $CO_2$;
   a condenser fluidly coupled to the stripper and configured to receive at least a portion of the upper product and produce a condensed stream;
   an accumulator fluidly coupled to the condenser and configured to receive at least some of the condensed stream and produce a $CO_2$ product stream and a condensate stream;
   a first heat exchanger fluidly coupled to the stripper and configured to allow heat exchange contact of a solvent stream from the stripper with a second heat exchange medium, and produce a reboiler stream and a reboiler condensate; and
   a second heat exchanger fluidly coupled to the stripper and configured to receive at least a portion of the condensate stream, and to allow for heat exchange contact of the portion of the condensate stream with the reboiler condensate from the first heat exchanger to produce the steam.

2. The system of claim 1, wherein the heat exchanger is configured to receive a first portion of the condensate stream, and wherein the reflux stream comprises a second portion of the condensate stream.

3. The system of claim 1, wherein the second heat exchange medium comprises low pressure steam.

4. The system of claim 1, wherein the first heat exchanger comprises a reboiler.

* * * * *